(12) United States Patent
Alt et al.

(10) Patent No.: US 12,226,929 B2
(45) Date of Patent: Feb. 18, 2025

(54) COMPONENT MADE FROM A MATERIAL CONSISTING PREDOMINANTLY OF RENEWABLE RAW MATERIALS, HAVING AT LEAST ONE COMPRESSED REGION, AND METHOD AND TOOL FOR PRODUCING THE COMPRESSED REGION

(71) Applicant: Technische Universität Chemnitz, Chemnitz (DE)

(72) Inventors: Christoph Alt, Chemnitz (DE); Eric Penno, Jahnsdorf (DE); Sven Eichhorn, Leipzig (DE); Ronny Eckardt, Leubsdorf (DE)

(73) Assignee: LIGenium GmbH, Chemnitz (DE)

( * ) Notice: Subject to any disclaimer, the term of this patent is extended or adjusted under 35 U.S.C. 154(b) by 0 days.

(21) Appl. No.: 17/630,950

(22) PCT Filed: Jul. 31, 2020

(86) PCT No.: PCT/DE2020/100684
§ 371 (c)(1),
(2) Date: Jan. 28, 2022

(87) PCT Pub. No.: WO2021/018354
PCT Pub. Date: Feb. 4, 2021

(65) Prior Publication Data
US 2022/0274282 A1    Sep. 1, 2022

(30) Foreign Application Priority Data
Aug. 1, 2019  (DE) .......................... 202019104241.9

(51) Int. Cl.
B32B 3/26       (2006.01)
B27M 1/04      (2006.01)
(Continued)

(52) U.S. Cl.
CPC .............. *B27M 1/04* (2013.01); *B29C 70/545* (2013.01); *B32B 3/266* (2013.01); *B32B 15/10* (2013.01);
(Continued)

(58) Field of Classification Search
CPC ....... B32B 3/266; B32B 15/10; B32B 21/042; B32B 21/06; B32B 21/08; B29C 70/545;
(Continued)

(56) References Cited

U.S. PATENT DOCUMENTS 3,977,142 A  *  8/1976  Dove ...................... F16B 15/06
                                                             411/394
4,248,820 A       2/1981  Haataja
(Continued)

FOREIGN PATENT DOCUMENTS

DE       2632695 C2      7/1976
DE       7623015 U1     11/1976
(Continued)

*Primary Examiner* — Catherine A. Simone
(74) *Attorney, Agent, or Firm* — Michael Soderman

(57) ABSTRACT

The invention relates to a component made from a material consisting predominantly of renewable raw materials, the component having at least one hole with a longitudinal axis (A) and the material being locally compressed in the region peripherally adjoining the hole. According to the method, at least one pin, which comprises a substantially cylindrical shaft and a tip having a reducing diameter in the direction of the component, penetrates into the material, thus creating a hole in the component, and displaces the wood material radially and/or axially, so that the material in the region surrounding the hole is compressed. The tool used for carrying out the method is designed in the form of at least one pin having a cylindrical or polygonal shaft and a tip reducing in diameter in the direction of the component.

4 Claims, 3 Drawing Sheets

A

B

(51) Int. Cl.
*B29C 70/54* (2006.01)
*B32B 15/10* (2006.01)
*B32B 21/04* (2006.01)
*B32B 21/06* (2006.01)
*B32B 21/08* (2006.01)

(52) U.S. Cl.
CPC ............ *B32B 21/042* (2013.01); *B32B 21/06* (2013.01); *B32B 21/08* (2013.01)

(58) Field of Classification Search
CPC ....... B29C 39/10; B29C 39/22; B29C 43/021; B27M 1/04; B27M 5/00; F16B 5/01; F16B 5/0642; F16B 5/02; F16B 5/0283; F16B 5/0291; F16B 25/0031; F16B 33/06
See application file for complete search history.

(56) References Cited

U.S. PATENT DOCUMENTS 6,019,153 A 2/2000 Knokey
6,830,797 B2 * 12/2004 Haataja .................... B27N 3/04
264/156

FOREIGN PATENT DOCUMENTS

| | | |
|---|---|---|
| DE | 19724284 C2 | 12/1998 |
| DE | 10112937 A1 | 9/2002 |
| DE | 102016120728 A1 | 5/2018 |
| DE | 102017006050 A1 | 12/2018 |
| EP | 0089755 A2 | 9/1983 |
| JP | S6342819 A | 2/1988 |
| WO | 2016162111 A1 | 10/2016 |

* cited by examiner

COMPONENT MADE FROM A MATERIAL CONSISTING PREDOMINANTLY OF RENEWABLE RAW MATERIALS, HAVING AT LEAST ONE COMPRESSED REGION, AND METHOD AND TOOL FOR PRODUCING THE COMPRESSED REGION

CROSS REFERENCE TO RELATED APPLICATIONS

This application is the U.S. national stage of International Application No. PCT/DE2020/100684, filed on 2020 Jul. 31. The international application claims the priority of DE 202019104241.9 filed on 2019 Aug. 1; all applications are incorporated by reference herein in their entirety.

BACKGROUND

The invention relates to a component made of a material consisting predominantly of renewable raw materials, having at least one compressed region, and to a method and a tool for producing the compressed region, and is applied in particular for permanently fixed screw connections.

From the prior art, the use of nails and screws as fastening means as well as bolt connections with the necessity of prior pre-drilling with tools with geometrically defined cutting edge is known. In the case of nails and screws, the pull-out resistance is largely dependent on the bulk density of the material. With all types of joints, settlement phenomena, which are usually detrimental to the joint strength, occur mainly in the wood-based material. For a durable connection for a metallic fastening means, a high tightening torque is necessary, which results in a high surface pressure under the screw head/nut/washer, among other things. As a result, the tension in the wood-based material is increased and relaxation and retardation phenomena occur, which are detrimental to the joint strength. In the prior art, this effect is mitigated by increasing the contact surface, e.g. by additional elements such as washers or by using inserts or sleeves in the drill hole.

The publications DE 26 32 695 C2 and DE 76 23 015 U1 describe a compensating bushing for fastening handles or the like. Conical bushings are arranged between the fastening object (e.g. handle) and the base (e.g. wooden panel). The base has a through-hole in the area of the fastening point. When the handle is screwed to the base, a pressing of the bushings into the base is realized. According to the description, this results in a displacement and thus a compression and consolidation of the wood. Furthermore, the components are centered in relation to each other, which leads to a more precise positioning of these in relation to each other. These effects result in the realization of a connection that is capable of absorbing high radial, axial and tilting forces.

DE 197 24 284 C2 describes a coupling purlin consisting of several overlapping adjoining wooden beams and a screw for a coupling purlin. In this invention, screws are used which are characterized by a stepped shank. Both areas are provided with threads of the same pitch, but of different diameters. The threads do not have a primary cutting function, but a displacing function. The stepped design of the screw shank results in a two-stage hardening of the material and thus an additional increase in the load-bearing capacity of the connection. A further positive effect is achieved in that the screw head is designed as a relatively slender cone. This design has the effect that the latter can be easily countersunk without the need for an additional operation by forming a countersink. The screw head taper results in further material strengthening. It is stated in the patent that the screws can be installed without pre-drilling, without the risk of the wood cracking at its ends.

DE 10 2016 120 728 A1 describes a tapered screw for foamed plastics. This is a connection in a plastic with a defined elasticity. The screw thread is tapered. When the thread is screwed in, the material is not destroyed but displaced and compressed. The deeper the thread is screwed in, the larger the diameter of the taper and the more material is displaced. This leads to an increase in the restoring torque which is necessary for screwing in, and thus to an increase in the contact pressure which is formed between the parts to be joined. This results in a large surface pressure between them, which leads to a loadable connection.

WO 2016 162 111 A1 describes a reversible connection between machine parts. A flowable medium is introduced into a cavity of a component and the cavity is closed. In the exemplary embodiment, this is a shaft. A tapered body is screwed into the flowable medium and displaces it. Thus, a pressure is built up in the cavity, which causes it to expand, whereby, for example, a shaft-hub connection can be realized.

All the above-mentioned patent specifications with regard to compression generally refer to the fact that the compression of the local area is caused by the fastening means during the tightening of the fastening means. As a result, the compression quality is only as great as the possible maximum pretensioning force of the fastening means as a function of the screw head surface in combination with the compressive strength of the material to be compressed. The maximum possible compression to 1.4 $g/cm^3$ at which density the material exhibits its maximum possible mechanical properties cannot normally be achieved with pin-shaped fastening means and their resulting screw head surface. The tensile strength of the screw is exhausted well before the material reaches its maximum possible compressive strength. However, retardation or relaxation phenomena are only significantly reduced at this limit.

In the conventional production of boreholes in plate-shaped semi-finished products made of wood-based materials, the material undergoes a machining geometric change in shape. The disadvantage is that the mechanical material properties in the borehole edge area of the material are not changed or are changed so little especially with regard to the density properties and the compressive strength that there is no significant relevance.

SUMMARY

It is the object of the invention to develop a component made of a material consisting predominantly of renewable raw materials and having at least one compressed region, as well as a method and tool for producing the compressed region, which enables a local increase in the material density and thus in the mechanical properties without the necessity of introducing an additional fastening means, such as inserts or sleeves, having a higher density or strength than the original wood-based material.

This object is solved with the characterizing features of the first, ninth and seventeenth patent claim.

Advantageous designs result from the subclaims.

DETAILED DESCRIPTION

The component consists of a material which is predominantly formed from renewable raw materials, wherein the component has at least one hole with a longitudinal axis and, according to the invention, the material of the component has a local compression in the region adjoining the hole on the circumferential side. Local compression reduces settlement phenomena that occur when producing a bolted joint with another component.

In particular, the region of the component adjoining the hole circumferentially has radial and/or axial local compressions.

The component can be radially compressed in advance during axial compression. This would result in a combined compression of $1^{st}$ radial and $2^{nd}$ axial. Thus, the hole recess would be made in advance of the axial compression.

The $2^{nd}$ variant would be to implement an axial compression and subsequently a bore (machining).

Thus, the compression would not be a combination, but only a one-step compression with the subsequent screw recess in the machining process.

If the hole has a diameter and the circumference of the compressed region adjoining the hole is preferably up to five times the diameter of the hole.

The height of the compressed region is up to twenty times the hole diameter and is preferably reduced compared to the height of the component.

The hole present in the component is preferably a cylindrical or nearly cylindrical hole and is formed as a through-hole in the component or has a bottom.

The material of the component preferably consists of wood or has at least 50% content of renewable raw materials.

Particularly preferably, the material is a wood-based material to which less than 50% of other renewable raw materials, such as grass-based materials (bamboo), are added as required.

The component can also be a hybrid material such as Wood Plastic Composite (WPG) with renewable raw materials.

Further, the component may have one or more material layers of metal, plastic, fiber composite, paper or paperboard, or a combination of these material layers.

The component is preferably in the form of a board and has at least two layers of renewable raw materials, preferably three layers of wood, which can be combined with further material layers if required.

The hole is preferably embedded in the component at an angle of 90° to 45° to the upper side of the component.

The method for producing at least one compressed region in a component from a material which consists of at least 50% renewable raw materials is effected by at least one pin penetrating into the material of the component and thereby producing a hole in the component and displacing the material radially and/or axially and thereby producing a local compression (V) in the region of the material surrounding the hole.

Alternatively, the method for producing at least one compressed region in a component from a material which comprises at least 50% renewable raw materials is carried out by at least one pin penetrating into the material of the component and thereby producing a depression in the component and displacing the material radially and/or axially, thereby producing a local compression (V) in the material.

According to one design of the invention, two opposing pins may be used which alternately penetrate the component from opposite directions and create the hole with the diameter, thus displacing the material and compacting it in the area surrounding the hole.

Alternatively, two opposing pins may be used, creating a depression in the component from opposite directions and compacting the area of the component between the pins.

The at least one pin or the opposing pins may rotate at least during penetration into the component.

After partial penetration of a pin into the component, a return stroke movement of the engaged pin may occur, followed by a renewed forward stroke movement of the pin during which the pin continues to penetrate the component until the pin has completely penetrated the component.

If two opposing pins are used, a return stroke movement of one pin can be followed by a forward stroke movement of the opposite pin into the component. This is carried out alternately until the through-hole is created in the component.

A maximum penetration depth of the pin per forward stroke is thereby preferably determined as a function of the component (material and density of the component) as well as of a rotational speed of the pin and/or a of feed rate of the pin.

After reaching this defined maximum penetration depth per feed movement, the pin performs a return stroke. This prevents the component from heating up too much due to the resulting friction.

The corresponding values can be easily determined by reference tests. Preferably, the rotational speed and/or the feed rate and/or the maximum penetration depth are thus determined empirically.

The maximum penetration depth of the respective punch per stroke is determined in such a way that a temperature acting on the component due to the friction of the punch is a maximum of 200° C. (Possibly more or less depending on the component material).

The tool for carrying out the method serves to produce a predominantly radial compression and is designed in the form of at least one pin with a cylindrical or polygonal shank and a tip which reduces in diameter in the direction towards the component.

In this case, the tool for producing a predominantly axial compression in the direction towards the component has a flat/plane/conical surface with obtuse angle and/or widens in diameter away from the component.

The angle of the bluntly designed (temperature-loaded or cold) forming tool has at least the angle of the maximum possible elongation of the corresponding adjacent side before compression, which becomes the hypotenuse in the triangle after compression. This elongation must be at least 1% and thus the corresponding angle of the forming tool results as a function of the elongation.

The tip of the pin may also be in the form of a conical tip, a truncated cone, or any other shape reducing in diameter in the direction towards the component.

On the side of the component opposite to the pin, a counter-holder may be arranged and/or the pin may also be surrounded by a holding-down device. The pin can be set in rotation by means of a first drive and can be moved in the direction of the longitudinal axis of the pin by means of a second drive when radial compression is to be generated and a hole is to be produced.

Alternatively, the pin can only be moved in the direction of the longitudinal axis of the pin by means of a second drive, if only axial compression is to be produced.

According to a variant of the invention, the pin may be heated.

In the case of an unheated rotating punch, high temperatures can also be achieved by friction.

The tool can have a temperature sensor.

The axially or radially acting punch can also be unheated (cold), wherein high temperatures are also passively achieved with the rotating punch due to the friction with the component.

During the forming of the axial compression, the forming tool (the pin) can be cooled down (if it is heated) or formed in the hot state after the desired final shape has been achieved. The cooling can be generated actively or passively.

The invention relates to the formation of a permanently slip-resistant pretensioned connection point in a material consisting of at least 50% renewable raw materials with metallic fastening means, by minimizing the differences in the mechanical properties between the material and the metallic fastening means.

The sharp drop in the pretensioning force of metallic fastening means pretensioned in a slip-resistant manner, such as screws, due to relaxation and retardation phenomena occurring in the material of a component, is realized according to the invention by a locally defined increase in the raw material density. This local increase in density can be achieved by the solution according to the invention in the form of axial and/or radial compression during the manufacture of the semi-finished product or subsequently by means of corresponding tools according to the invention.

Fastening means for direct screwing, e.g. self-tapping, thread-forming screws, are excluded from this because they do not allow a permanent, slip-resistant, pretensioned connection.

According to the method according to the invention, the joint is compressed over the entire joint cross-section to such a high degree that a permanent slip-resistant pretensioned screw connection is realized without additional fastening means and retensioning. This type of material compression is not possible with fastening means of known type in the one- or two-stage process, because the permissible pretensioning force of the fastening means is too low for this. The deformation of the material, in particular the wood-based material or another renewable raw material (e.g. bamboo or a mixture of different renewable raw materials) in the joint is plastic, it is fixed in the manufacturing process with the plant's own components cellulose, hemicellulose and lignin via physical-chemical processes.

Lignins form a group of phenolic macromolecules composed of various monomeric building blocks. They are solid biopolymers that are incorporated into the plant cell wall and thereby cause lignification of the cell (lignification). These intercalations are found in the cell walls of lignified plants such as bamboo plants, grasses, perennials, shrubs and trees.

Lignin has a number of important roles for plants as a supporting material and hardened polymer. Lignins are essential for the strength of plant tissues, especially for their compressive strength, while the intercalated cellulose fibers provide tensile strength. Tear-resistant, flexible fibers (cellulose) are thus interspersed with a dense and rigid polymer as filler (lignin).

For the first time, the lignin contained in the component is used to create the local compression points in the component, which are generated by deforming the component in the area of the holes created. The lignin stabilizes the compression points because it reacts in a similar way to a thermoplastic.

The friction that occurs when the holes are produced with the tool heats the material, causing the lignin to plasticize and harden again when it cools, thereby restabilizing the reshaped area.

During or after the forming of the joint, neither the forming tool nor the fastening means remains in use for forming the joint after the forming process has been completed. In the following, the highly stressable joint incl. standard fastening means (machine screw, washers, nut) are used to implement the permanent slip-resistant pretensioned connection.

The component according to the invention has at least one local axially and/or radially generated compression point with a defined hole diameter, as a result of which the screw connection generated on the component withstands higher loads and settlement phenomena and internal stress reduction in the region of the screw connection are reduced due to the local compression points compared to conventional connections in which the components have no compression points. According to the method, the local hardening in the component is carried out by means of a corresponding tool which acts on the component from one direction or from two opposite directions. In particular, this is carried out by means of at least one rotating pin which exerts a defined material-dependent force on the workpiece. This is carried out by advancing the pin as a function of the rotational speed and the temperature occurring at the point of action.

Renewable raw materials are used in particular as materials, wherein the proportion of renewable raw materials should be at least 50%. Preferably, wood-based materials are used or also wood-based materials in combination with a proportion of renewable raw materials <50%.

In particular, the material of the components consists of predominantly renewable raw materials such as wood-based materials, grass-based materials (bamboo) or hybrid materials such as wood plastic composite (WPG) or wood-based materials with metallic layers, plastic layers, paper or cardboard layers as cover and/or intermediate layers or any combination of the aforementioned materials. If materials made of wood are used, these are in particular components with a layered structure having at least three interconnected layers. Such components are referred to as laminated wood.

Preferably, the component is made of laminated wood, in particular plywood. Plywood is the more specified lay-up type of veneer, where the direction-dependent properties are reinforced by a fiber orientation, in particular 0°-90°, into a blocking effect. However, other plywoods with orientations deviating from 0°-90° can also be used.

However, components made of bamboo or with a bamboo content can also be used, or in general renewable raw materials that contain lignin.

The components are in particular of plate-shaped design, but can also have other geometric shapes.

With regard to the surface of the component, an angle of attack of the workpiece of 90° can preferably be applied, but also an angle of the machining direction deviating from this, such as up to 45°, for example.

The tool produces an almost cylindrical hole, which is designed as a through-hole or can also have a bottom.

The range of local consolidation as a function of the generated diameter D of the hole is preferably up to 5×D for radial compression and up to 20×D for axial compression.

D is the forming tool diameter. The range of compression is larger and dependent on D (a multiple=20×) of the local area of influence of a generated cylindrical hole. The processes all take place in the defined local area of up to 20×D around the hole created with the punch.

It is possible to create the hole with the surrounding compression point without pre-drilling or also with pre-drilling.

With a diameter to plate thickness ratio (for a plate-shaped component) as an area without pre-drilling, the ratio is up to 1:2 (example: 10 mm tool diameter, 20 mm plate thickness). With a ratio from 1:4 to 10:1 diameter D of the hole to be produced to plate thickness, a diameter-dependent pre-drilling should be carried out.

The diameter to be pre-drilled should be 0.1 to 0.9×D.

The temperature range at the point at which the workpiece acts, i.e. at the effective point, should be between 0° C.-210° C., preferably 100° C.-150° C., particularly preferably at 140° C. In particular at temperatures above 100° C., the lignin contained in the material is plasticized in conjunction with the forming pressure acting in the material and solidifies again on cooling.

It is possible to realize the insertion of the holes with or without counter-holder. A counter-holder is possible, for example, with one-sided and two-sided radial compression process, with one-sided or two-sided pressing in of the holes and/or combined compression—axial and/or radial.

Preferably, the method is carried out without a holding-down device. However, a holding-down device can also be provided on the side of the tool, which surrounds the tool and acts on the surface of the component with a holding-down device force.

This can be the case in a one-sided compression process, i.e. when only one tool is used to produce the hole, or also in a two-sided radial compression process, i.e. when two opposing tools act on the component, one pin on each side of the plate-shaped component.

This means that the holding-down device can be used for one-sided/two-sided compression and/or combined compression.

With the solution according to the invention, when the holes required for a screw connection are made, local reinforcements are produced in the component, which ensure a higher load-bearing capacity of the screw connection.

BRIEF DESCRIPTION OF THE DRAWINGS

The invention is explained in more detail below with reference to an exemplary embodiment and associated drawings, wherein.

DETAILED DESCRIPTION OF THE PREFERRED EMBODIMENTS

Figure 1:
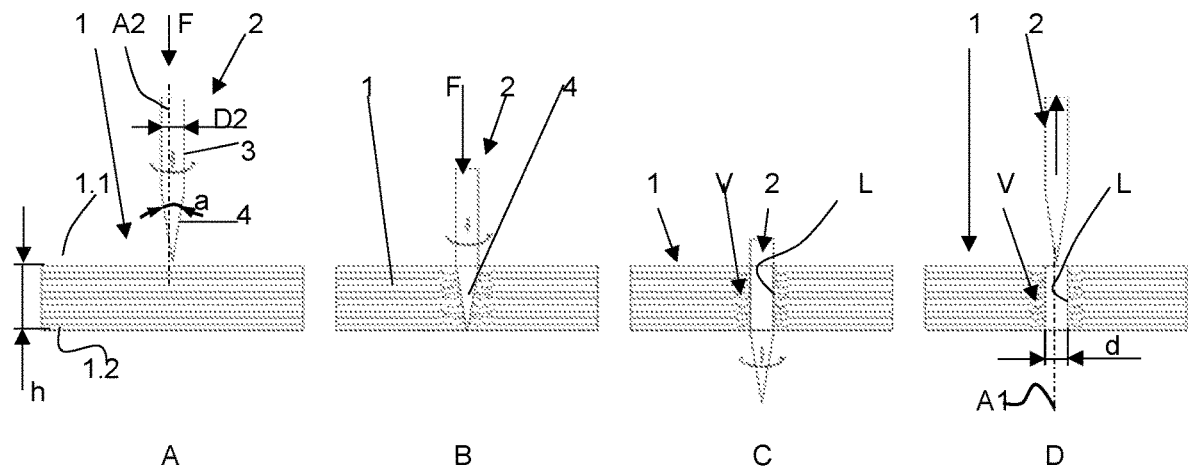
FIG. 1 shows the schematic diagram of the method sequence when penetrating the component on one side with a pin.

In FIG. 1, the schematic diagram of the method sequence during the penetration of the component 1 on one side with a tool which has a pin 2 or is designed as a pin 2, which has a longitudinal axis A2, is shown in the steps A to D. The component 1 is a multi-glued wooden panel (plywood) having a first side 1.1 and a second side 1.2 and a height h. The pin 2 has a cylindrical shank 3 with a diameter D2, which is adjoined by a tip 4 in the direction towards the component 1. The tip 4 is here substantially conical in shape and has a cone angle a, which is preferably between 15° and 20° (but the angle can also be larger or smaller).

In step A, the rotating pin 2 is moved with the tip 4 in the direction of the upper side 1.1 of the component 1, is seated here on the side 1.1 and is now pressed into the component 1 with a force F in the preliminary stroke, wherein according to step B the material of the component 1 is largely displaced radially and partially compressed. In step C, the pin 2 has penetrated the component 1 and a hole L has been formed in the component 1 by the displacement of the material. Around the hole L, local radial compressions V have been produced over the entire height h of the component 1 by the displacement of the material of the component 1. Subsequently, the pin 2 is removed from the component 1 in a return stroke preferably rotating according to step D in the direction of the arrow. The hole L created in the component 1 has a longitudinal axis A1 and a diameter d, wherein the diameter d corresponds to the diameter D2 of the pin 2. The local compression V surrounding the hole L remains in the component 1 after removal of the pin 2, since this is stabilized by the thermoplastically reacting lignin in the forming region of the material.

It is also possible for the pin 2 to first partially penetrate the component 1, to be retracted again, and then to penetrate deeper into the component 1 again, thus performing an alternating forward and return stroke movement until the pin 2 has completely penetrated the component 1.

Figure 2:
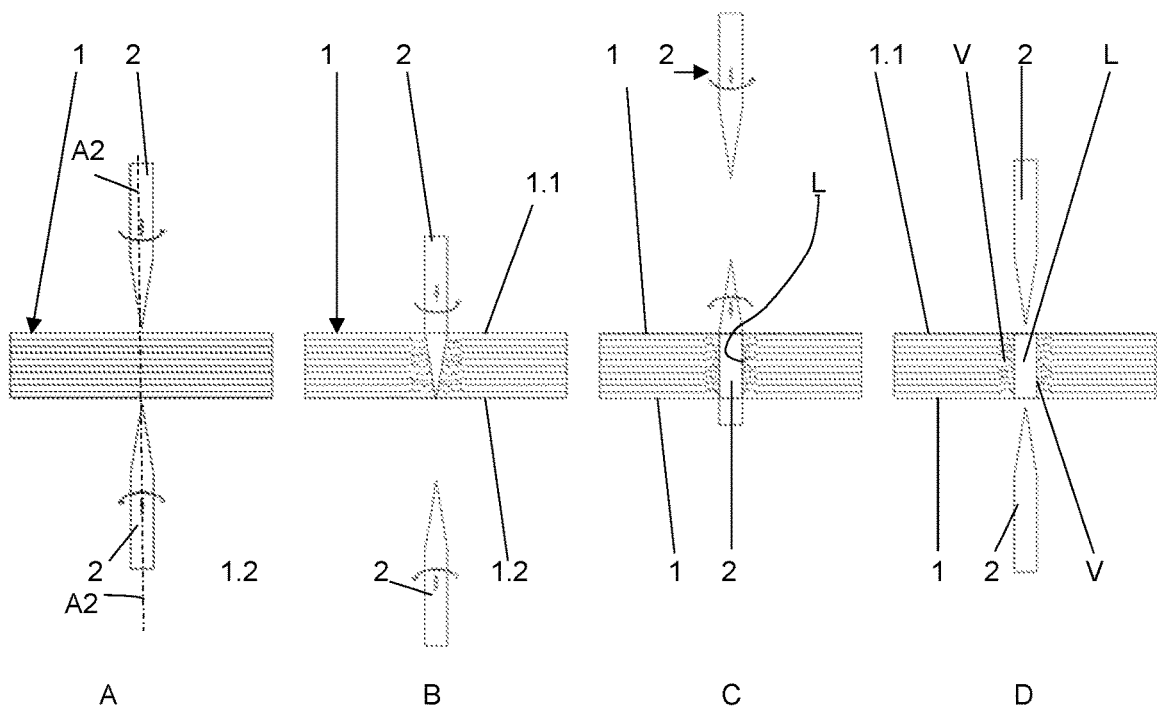
FIG. 2 shows the schematic diagram of the method sequence for two-sided penetration of the component with two opposing pins.

FIG. 2 shows the schematic diagram of the method sequence with the steps A to D during the two-sided penetration of the component 1 with two oppositely arranged pins 2, the longitudinal axes A2 of which are aligned and which penetrate alternately from both sides 1.1, 1.2 always with a feed into the component 2 until the hole L has formed completely in the component 1 (step C). According to step A, no rotating pin 2 has yet penetrated the component 1. In step B, the upper pin 2 here has entered the component 1 from the direction of the upper side 1.1 of the component 1, but has not yet penetrated it. According to step C, the upper pin 2 has retracted from the component 1 and the lower pin 2 has entered it from the direction of the underside 1.2 of the component 1 and has penetrated it completely and has produced the hole L. Thereupon, the lower pin 2 has also been disengaged according to step D and the method is completed. In the aforementioned examples, the pin 2 is inserted substantially at right angles=angle 90° to the upper side 1.1 or to the underside 1.2 of the component 1. It is also possible to form the pin 2 into the component 1 at a different angle of inclination, thereby creating a hole L whose longitudinal axis A1 runs obliquely in the component.

It is further possible that the punch is surrounded by a holding-down device which acts on the upper side or underside 1.1, 1.2 of the component 1 during the forming of the hole, depending on the direction from which the pin 2 engages.

Figure 3:
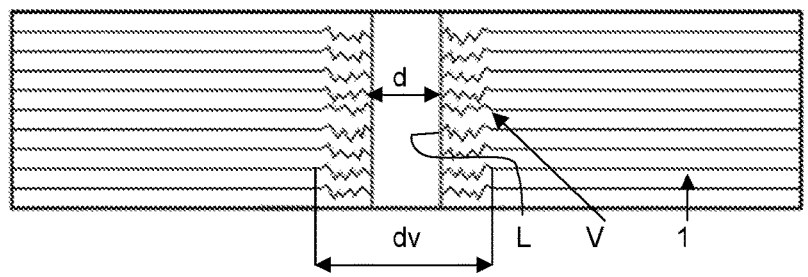
FIG. 3 shows the schematic diagram of a component with radial compression according to the invention.

The schematic diagram of a component 1 with a radial compression V according to the invention is shown in FIG. 3.

A hole L with a diameter d was created in component 1 without pre-drilling. The radial compression V of the material here, which is adjacent to the hole L on the circumference, has a diameter dv of up to 5×d on the circumference. In the example shown, dv is approximately 2×d.

Figure 4:
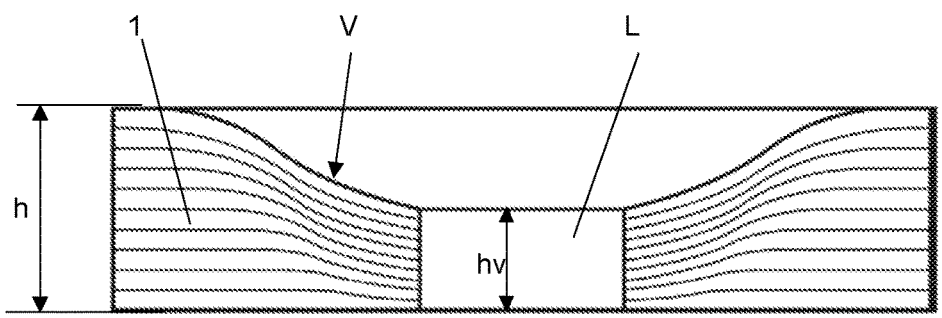
FIG. 4 shows the schematic diagram of axial compression according to the invention over the complete connection cross-section of the component.

According to FIG. 4, it is also possible to generate only an axial compression V which extends over the complete connection cross-section of the component 1. The hole L was made by pre-drilling and then the area of the hole L adjoining the periphery of the hole was provided with the axial compression V by an axially acting punch (not shown). The height hv of the compressed region V in the area of the hole L is here approximately 0.5×h.

Figure 5:
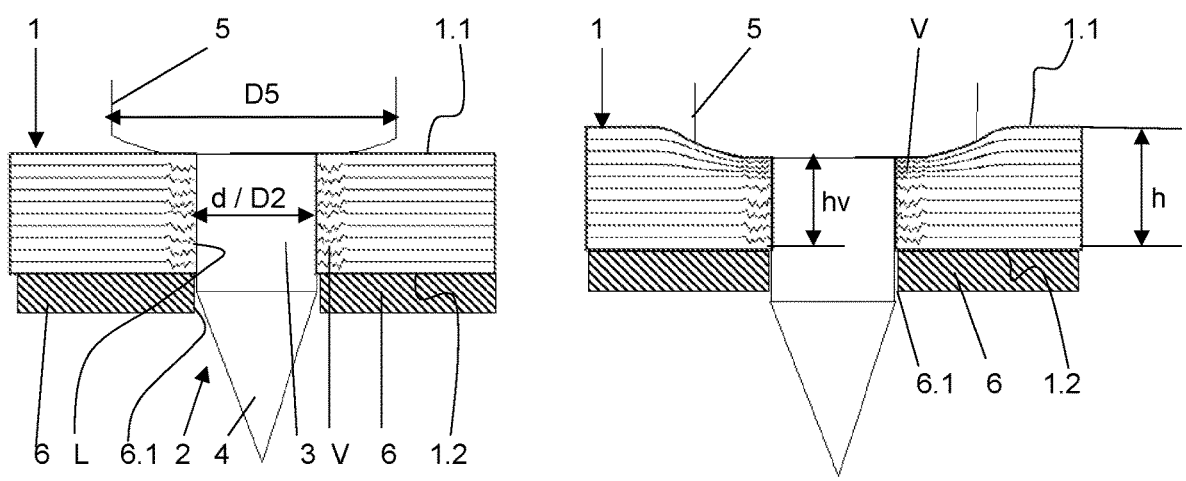
FIG. 5 shows the schematic diagram of generating radial and axial compression using a counter-holder.

FIG. 5 shows a schematic diagram of the generation of a radial and axial compression V using a pin 2 having a shoulder 5 with a diameter D5, which is adjacent to the shank 3, and a counter-holder 6. First, in step A, the radial compression V was generated using the pin 2 and its tip 4, in that the pin 2 enters the component 1 from the direction of the upper side 1.1 and has penetrated it completely, so that the hole L with the diameter d was generated.

During a further feed, the shoulder 5 is pressed axially into the component 1 (see step B), so that in addition to the radial compression, an axial compression V of the material in the component 1 is produced in the component 1 from the direction of the upper side 1.1, wherein the height h of the component 1 is reduced to a height hv in the region of the acting shoulder 5.

On the underside 1.2 of the component 1, in both stages, a counter-holder 6 abuts which has a hole 6.1 through which the pin 2 can engage.

Figure 6:
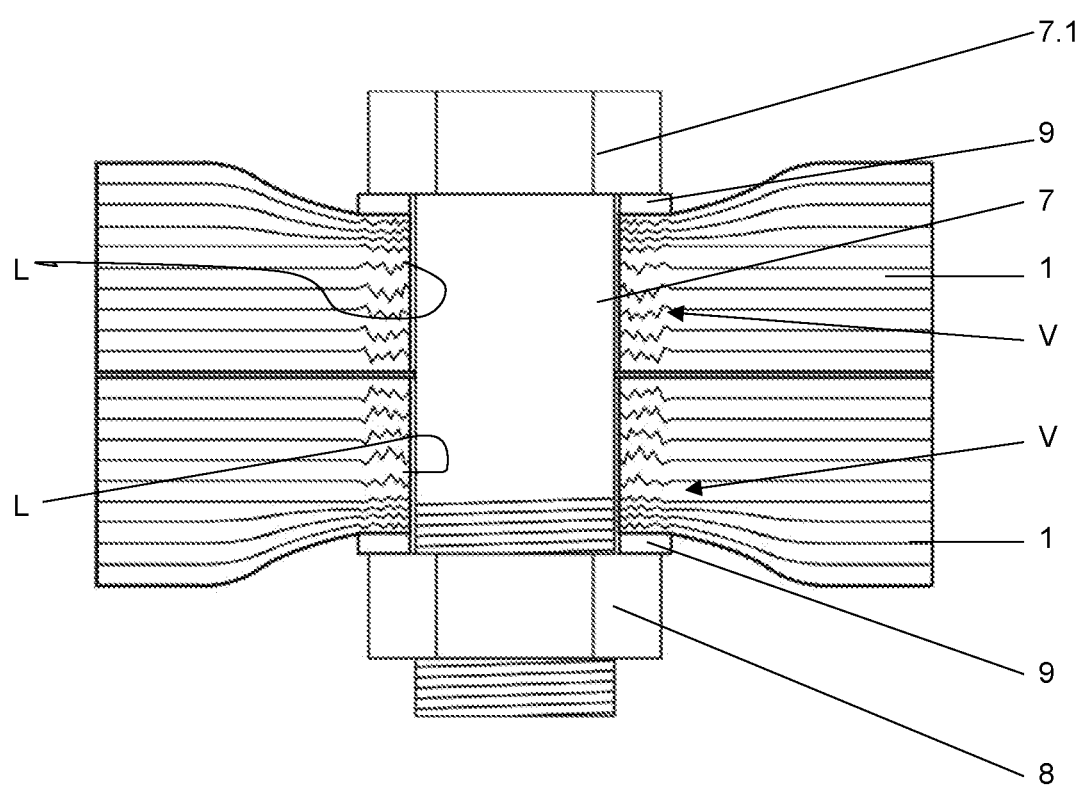
FIG. 6 shows the screw connection of two components 1 with axial and radial compression.

A screw connection with axial and radial compression V is shown in FIG. 6. Two components 1 lie against each other with their flat undersides 1.2 and are connected to each other by a screw 7 and a nut 8, wherein the screw 7 projects through the holes L of the components 1, which holes L are aligned with each other. A washer 9 is provided under the screw head 7.1 and under the nut 8 in each case.

The compressed region V in the two components 1 allows a higher pretension and reduces the settlement or relaxation and retardation phenomena.

LIST OF REFERENCE NUMERALS

1 Component
1.1 Upper side
1.2 Underside
2 Pin
3 Shank
4 Tip
5 Shoulder
6 Counter-holder
7 Screw
7.1 Screw head
8 Nut
9 Washer
a Cone angle of the tip
b Angle of penetration of the pin
d Diameter of the hole L
dv Circumference of the compressed region
h Height of component 1
hv Height of the compressed region
A Longitudinal axis
D2 Diameter of the pin that adjoins the tip 4
D5 Diameter of the shoulder 5
F Force
L Hole
V Compression

The invention claimed is:

1. Component made of a material comprised predominantly of renewable raw materials, characterized in that the component (1)
consists of plywood
or
is designed in the form of a board and comprises at least three layers with renewable raw materials, which are combined with further material layers, wherein the component has one or more material layers of metal, plastic, fiber composite material, paper or cardboard or a combination of these material layers,
and
that the component has at least one hole (L) with a longitudinal axis (A1) serving to produce a connection by means of a screw connection to a second component in order to produce a connection by means of a screw connection
and
that the material of the component (1) in a region adjoining the hole (L) on the circumferential side has
local compression (V) realizing a permanently slip-resistant pretensioned connection point for the screw connection generated via the penetration and the subsequent removal of a rotating pin with a cylindrical shank (3) and a tip (4) which reduces in a diameter in the direction towards the component (1)
wherein the hole (L) is a cylindrical or nearly cylindrical hole (L) and is designed as a through-hole in the component (1) or has a bottom
and
that a region of the component (1) adjoining the hole (L) on the circumferential side has radial and/or axial local compressions (V)
and
that the hole (L) has a diameter (d) and
a circumference (dv) of a compressed region adjoining the hole (L) on the circumferential side is up to 5×d
and/or
that the height (hv) of the compressed region is up to 20×d and/or is reduced in comparison with the height (h) of the component (1).

2. Component according to claim 1, characterized in that the material of the component (1) has at least 50% content of renewable raw materials.

3. Component according to claim 2, characterized in that the material is a wood-based material and in that less than 50% of other renewable raw materials are added to the wood-based material,
and/or
in that the component (1) is a hybrid material with renewable raw materials.

4. Component according to claim 1, characterized in that the hole (L) is introduced into the component (1) at an angle (b) of 90° to 45° with respect to the upper side (1.1) of the component (1).

* * * * *